(12) United States Patent
Roberts et al.

(10) Patent No.: US 11,462,925 B2
(45) Date of Patent: Oct. 4, 2022

(54) STORAGE AND CHARGING STATION SYSTEM FOR MOBILE ELECTRONIC DEVICES HAVING A UNITARY SUPPORT TOWER CAGE STRUCTURE

(71) Applicants: Nathan R. Roberts, Columbus, WI (US); Beau M. Wishner, Columbus, WI (US)

(72) Inventors: Nathan R. Roberts, Columbus, WI (US); Beau M. Wishner, Columbus, WI (US)

(73) Assignee: Nathan R. Roberts, Columbus, WI (US)

( * ) Notice: Subject to any disclaimer, the term of this patent is extended or adjusted under 35 U.S.C. 154(b) by 79 days.

(21) Appl. No.: 16/986,604

(22) Filed: Aug. 6, 2020

(65) Prior Publication Data
US 2022/0045529 A1 Feb. 10, 2022

(51) Int. Cl.
*H02J 7/00* (2006.01)

(52) U.S. Cl.
CPC .......... *H02J 7/0045* (2013.01); *H02J 7/0013* (2013.01); *H02J 7/00032* (2020.01); *H02J 7/0047* (2013.01)

(58) Field of Classification Search
CPC .................................................. H02J 7/0045
USPC ........................................................ 320/115
See application file for complete search history.

(56) References Cited

U.S. PATENT DOCUMENTS

| 9,323,288 | B2 | 4/2016 | Dresser, III |
| 9,501,380 | B2 | 11/2016 | Johnson et al. |
| 9,680,317 | B2 | 6/2017 | Roberts |
| 9,817,749 | B2 | 11/2017 | D'Abreu et al. |
| 10,084,327 | B2 | 3/2018 | Roberts |
| 1,005,045 | A1 | 8/2018 | Todasco |
| 10,076,050 | B2 | 9/2018 | Roberts |
| 10,312,700 | B2 | 6/2019 | Roberts |
| 10,412,853 | B2 | 9/2019 | Dombrowski et al. |
| 10,638,630 | B2 | 4/2020 | Roberts |
| 2015/0220416 | A1 | 8/2015 | Johnson et al. |
| 2015/0380964 | A1* | 12/2015 | Tischer ............... H02J 7/0044 320/114 |
| 2016/0056645 | A1* | 2/2016 | Henman ............... H02J 7/0045 320/112 |
| 2016/0268822 | A1* | 9/2016 | Toya .................... H02J 7/0047 |
| 2016/0276852 | A1* | 9/2016 | Roberts ................ A45C 13/02 |

(Continued)

*Primary Examiner* — Yalkew Fantu
(74) *Attorney, Agent, or Firm* — Boardman & Clark LLP

(57) ABSTRACT

A storage and charging station system for mobile electronic devices includes a support tower cage structure having vertically extending rear and side panels. A plurality of planar support shelves engage horizontal slots on the panel front sides and at least one associated rear channel shelf support surface on the rear panel to support a vertical array of mobile electronic devices. The shelves may include side support shelves extending outward through supporting panel slots in a side wall for supporting additional electrical components. Openings are provided in the cage structure panels for observation of mobile electronic devices, for ventilation, and for facilitating transmission of electrical data to and from the mobile devices. Cable management apertures and slots are provided in at least one panel and shelf portions. A lockable door may be attached to secure the contents of the cage structure. A lockable side cover may also be provided.

18 Claims, 8 Drawing Sheets

(56) References Cited

U.S. PATENT DOCUMENTS

| | | |
|---|---|---|
| 2017/0039122 A1 | 2/2017 | Johnson et al. |
| 2017/0047751 A1 | 2/2017 | Fernandes |
| 2018/0351375 A1 | 12/2018 | Baldasare et al. |
| 2019/0027944 A1 | 1/2019 | Grzybowski et al. |

* cited by examiner

STORAGE AND CHARGING STATION SYSTEM FOR MOBILE ELECTRONIC DEVICES HAVING A UNITARY SUPPORT TOWER CAGE STRUCTURE

FIELD OF THE INVENTION

The present invention relates to storage and charging stations for electronic devices. More specifically, the present invention relates to a system for centralized storage, charging, deployment, inventorying and management of mobile electronic devices.

BACKGROUND

Mobile electronic devices are generally known in the art. Mobile electronic devices, such as tablet and laptop computers, have become common place in personal and professional endeavors, including educational and business setting. Desktop computers initially paved the way for common personal and business use of computers for word processing, data entry, planning, general and technical information-transfer, business management, remote communication, self-education and other uses. Improving mobile electronic devices, including cell phones, rapidly increased individual electronics use within organizations, including educational and business organizations, which now may centrally purchase quantities of generally uniform selected mobile electronic devices for use by students, employees, or other users served by such organizations.

These purchasing organizations may desire a certain amount of control of the mobile electronic devices. The amount of control to assert may be dependent upon a number of factors considered by organizations, including, but not limited to, management of the mobile electronic devices, inventory of the mobile electronic devices, the type of user of mobile electronic devices, the number of potential users for each mobile electronic device, the environment in which the mobile electronic device is in use, the relationship between the user and purchasing organization, the number of mobile electronic devices in use, updating and maintenance of the mobile electronic devices, and/or minimizing risk of loss and/or replacement costs of the mobile electronic devices. Which factor(s) have the greatest weight dictating the necessary amount of control will be dependent upon the specific purchasing organization.

For example, in a school setting, a mobile electronic device may be assigned to a specific student. That student may pick up the mobile electronic device at a certain time during the school day, such as at the beginning of the school day, use it throughout the school day, and return the mobile electronic device at the end of the school day. In another example, in a school setting, a classroom of students may use a number of mobile electronic devices for a period of time during the day. As the students turn over in the classroom, such as by changing classes during the day, different students may use the number of mobile electronic devices. As such, a plurality of different students may use a single mobile electronic device during a day. In these examples, while utilizing the mobile electronic devices as an educational tool is an outstanding way for students to learn, it can lead to issues in maintaining the mobile electronic devices. For example, it may be difficult to inventory the devices during the day, charge or recharge the devices, account for the return of all devices once students complete use of the devices, and/or efficiently deploy new software or associated updates.

Similar to a school setting, mobile electronic devices may be deployed for public use at libraries or other public access building. In this setting, the mobile electronic devices may be checked out to users for a period of time. Again, many of the same problems as would arise in an educational setting, such as the ability to inventory or account for the return of all devices, may arise at these public settings.

As another example, businesses or hospitals/medical service providers may deploy mobile electronic devices in association with business operations or providing medical services, respectively. For efficiency or operational gains to be realized by use of the mobile electronic devices, the mobile electronic devices must be operational and must be used. The inability of the business or medical service provider to control the mobile electronic devices can interrupt any efficiency or operational gains. For example, should an employee take a mobile electronic device from the premises and forget to return it, that employee will not be able to use the mobile electronic device during performance of his or her job. Similarly, if an employee fails to charge or fully recharge the battery of the mobile electronic device, the mobile electronic device can run out of power during an employee's workday, rendering the mobile electronic device useless. This and other situations not referenced can lead to inefficiencies and unnecessary risks of loss.

Accordingly, purchasing organizations have utilized storage and charging stations which can be conveniently located within the organization's various business and educational facilities for organizing, storing, charging, accessing and returning the organization's mobile electronic devices to an assigned station for recharging and future user access and independent use. Examples of such storage and charging stations in current use are disclosed and described in U.S. Pat. No. 10,312,700.

SUMMARY

The present invention provides one or more examples of embodiments of a storage and charging station system for mobile electronic devices incorporating a unitary support tower cage structure for securely retaining a plurality of mobile electronic devices in a vertically spaced array within a reachable height for its intended user group. The unitary support tower cage structure provides a vertical profile to allow for the storage and charging of a plurality of mobile electronic devices supported by vertically spaced generally horizontal support shelves mounted and supported within the unitary tower cage structure to define a storage bay above each support shelf while minimizing the amount of space and material consumed by the system. In addition, the unitary support tower cage structure provides for easy verification of inventory, as each of the spaced horizontal shelves is visible through a plurality of spaced multi-functional openings in the support cage walls which allow each storage bay and any mobile electronic device stored therein or the lack thereof to be visually verified from a distance outside the cage structure. The multi-functional openings in the support cage walls are further functional to provide ventilation and cooling during periods of charging all of the contained mobile electronic devices simultaneously, and to facilitate the transmission of electronic information and data to and from mobile electronic devices positioned within the tower cage structure, for the convenience of both system managers and users of the mobile devices. The system implements a cable management system to provide for centralized charging and/or data distribution to the plurality of devices while reducing the visibility and entanglement of associated cables. In addition, the system selectively distributes power to the plurality of electronic devices to facilitate charging and recharging of the mobile electronic devices. The system further may incorporate one or more locking assemblies to lock the plurality of electronic devices and electronic powering devices and associated electronic cables within the assembly and reduce the risk of device theft. The storage and charging station system of the invention advantageously provides for a central location for the storage, inventory, charging, identification and access to mobile electronic devices, thereby assisting in the deployment, inventory, management, and theft reduction of multiple mobile electronic devices and related components.

A storage and charging station for mobile electronic devices is provided. The station includes a unitary support tower cage structure including at least a first vertically extending side panel, a second vertically extending rear panel integrally connected to the first side panel and extending therefrom at an angle thereto, and a third vertically extending side panel integrally connected to the rear panel and extending therefrom at a substantial right angle thereto in generally opposed relation to the first side panel. The three vertically extending panels are further fixedly connected to each other near their lower edges by a flanged lower support shelf which spans the lower end of the space defined by the three unitary vertically extending panels, near their upper edges by a flanged cover panel, and typically near cage midpoint by a flanged middle support shelf. Multiple additional support shelves are provided in efficiently spaced relation between the lower flanged support shelf and the flanged cover, typically generally horizontally supported by support edges of channel members affixed to the inside surface of the tower cage structure and/or of support edges formed in the tower cage structure itself. In addition, each support shelf may have a protruding side support shelf portion which protrudes outwardly of the tower cage structure through a supporting shelf alignment slot in a cage side panel to provide a support surface with cable management slots for electronic USB cable or a power "brick" transformer and connecting cable to be provided for charging an electronic device supported on the associated interior shelf surface within the unitary cage structure. Additionally, a cable management aperture may be provided in the cage side panel above each shelf alignment slot to facilitate extension of the cable from above the side support shelf portions through the tower cage side panel for easy connection by the user to a mobile electronic device supported on the interior shelf surface.

The base of the unitary support tower cage structure may be fitted at the rear and front portions of the vertical side panels with suitable support pads. Security for the electronic components and mobile electronic devices supported by the tower assembly may be provided by a main door and a side cover, both pivotable between open and closed positions, and having lockable latches, while still providing visual access to the contents of the tower assembly. Taller unitary support tower cage structures of the described invention may be connected through the rear vertical panel and rear channel shelf supports thereof to free standing or mobile support frame systems as shown and described in previously identified U.S. Pat. No. 10,084,327, with reference to FIG. 50-57 thereof. These and other features and advantages of devices, systems, and methods described herein, will be apparent from the following detailed descriptions and drawings of various examples of embodiments of the invention.

BRIEF DESCRIPTION OF DRAWINGS

Various examples of embodiments of the systems, devices, and methods will be described in detail, with reference to the following figures, wherein.

Figure 1:
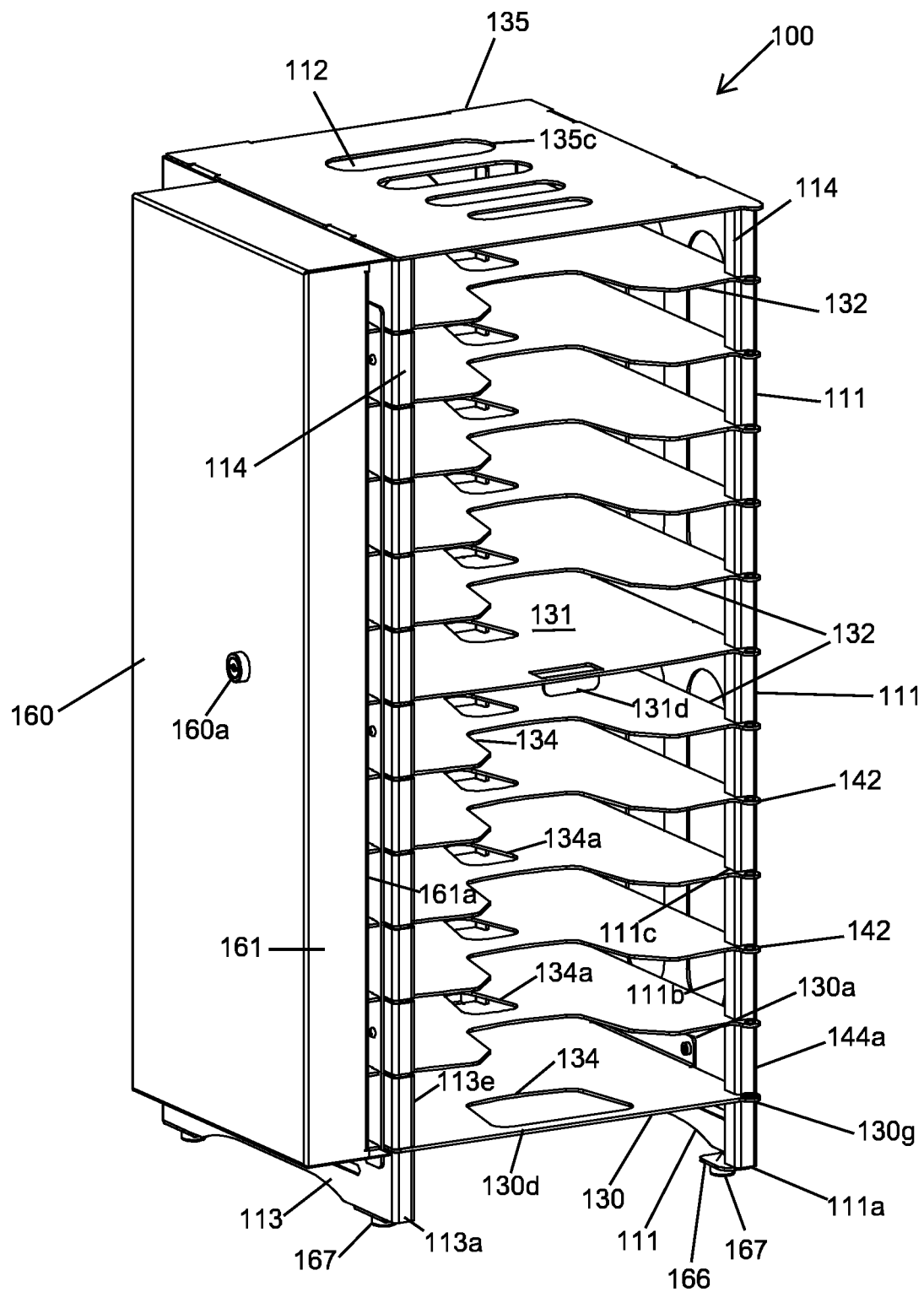
FIG. 1 is a right front isometric view of a storage and charging station system of the invention incorporating a unitary support tower cage structure for containing and supporting a plurality of vertically spaced horizontal shelves for receiving, storing and charging a plurality of mobile electronic devices.

It should be understood that the drawings are not necessarily to scale with each other, but do accurately show the disclosed details of the illustrated embodiments of the drawing. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the embodiments illustrated herein.

DETAILED DESCRIPTION

The invention illustrated in the Figures and disclosed herein is generally directed to one or more embodiments of a storage and charging station system having a unitary support tower cage structure for enclosing mobile electronic devices. For ease of discussion and understanding, the following detailed description will at times refer to a "mobile electronic device" 50, or a "plurality of mobile electronic devices" 50. While the Figures illustrate a mobile electronic device 50 as a laptop computer, it should be appreciated that a mobile electronic device 50 may be any suitable mobile electronic device requiring storage and/or battery charging or recharging. For example, a mobile electronic device 50 may include, but is not limited to, a laptop computer, a netbook computer, a notebook computer, a Google Chromebook™ computer, a tablet computer device (such as an Apple iPad®, Samsung Galaxy® or Microsoft Surface®), a mobile smartphone, or any other known or future developed mobile electronic device. The size of the unitary support tower cage structure can vary depending upon the size and number of mobile electronic devices to be accommodated, without loss of function.

Figure 2:
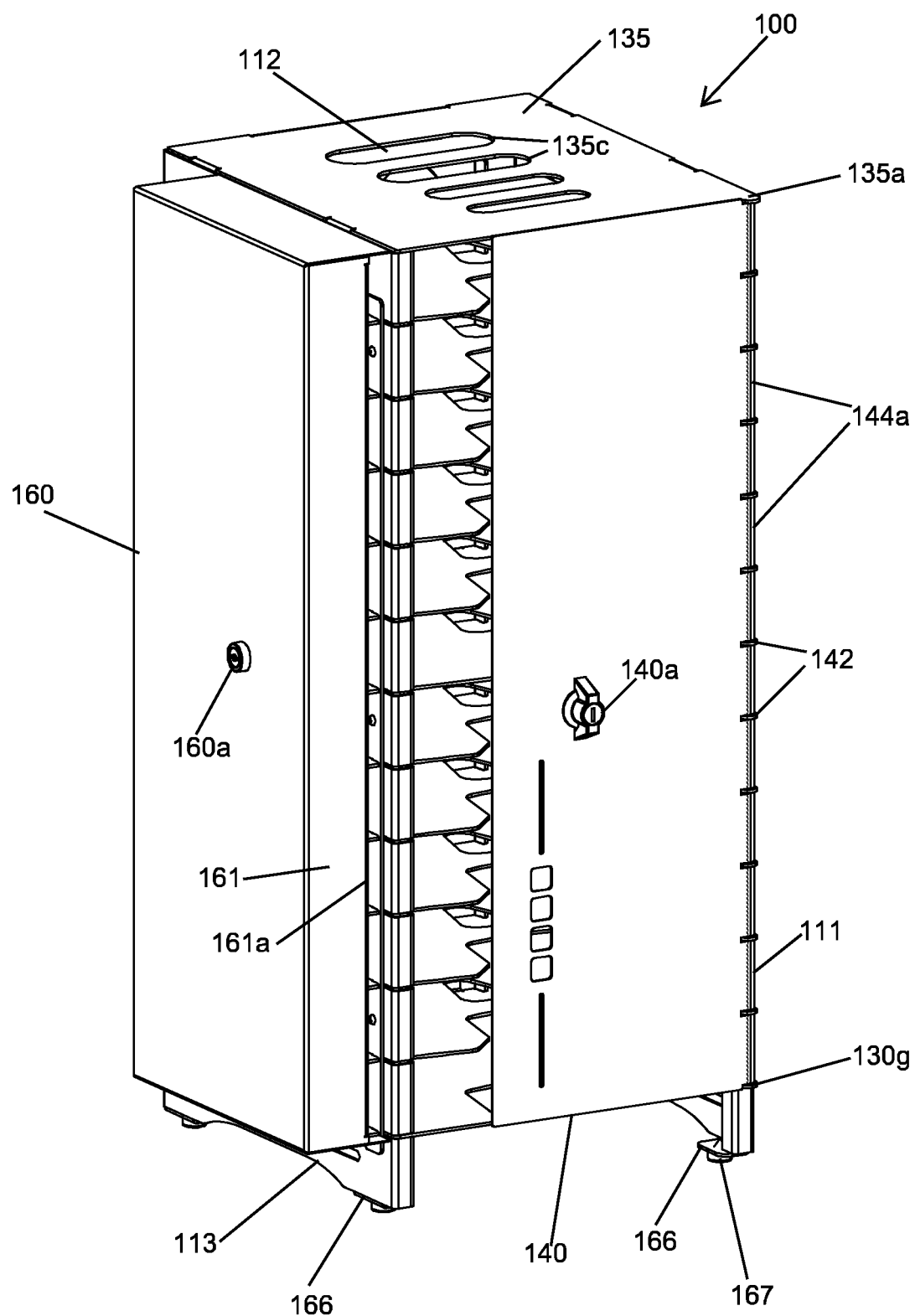
FIG. 2 is a right front isometric view of the storage and charging station system of FIG. 1 wherein a pivotal and lockable main door has been added for the purpose of securing visible mobile electronic devices supported within the unitary support tower cage structure.
Figure 3:
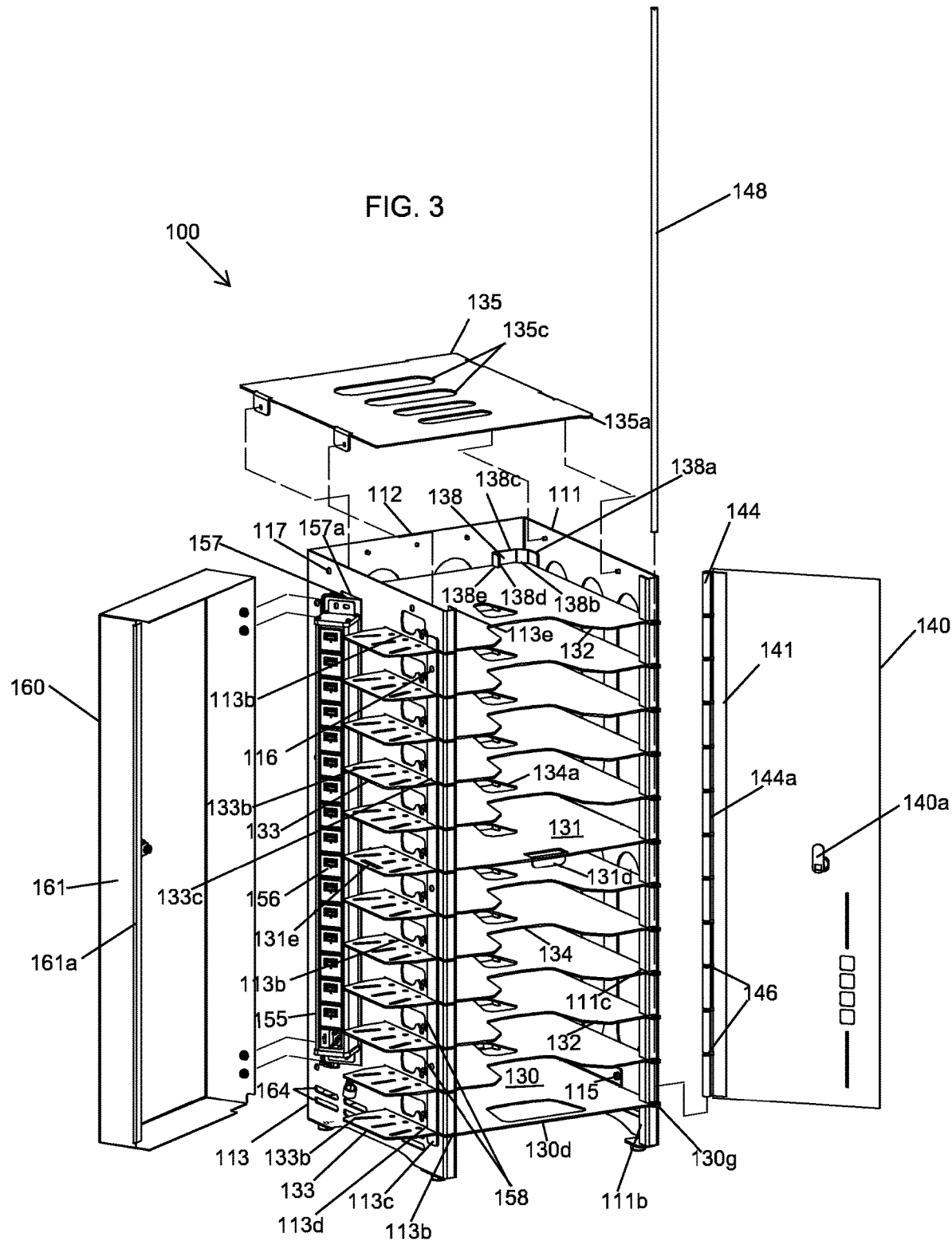
FIG. 3 is an exploded right front isometric view of the storage and charging station system of FIG. 2 for further illustration of the various components thereof.

Referring now to the Figures, FIGS. 1-6 respectively illustrate embodiments of a storage and charging station system 90 having a tower assembly 100 for enclosing a plurality of mobile electronic devices 50 in a vertical array. The tower assembly 100 comprises a unitary support metal cage structure 110 including at least a first vertically extending side panel 111, a second vertically extending rear panel 112 coupled to the first side panel 111 and extending horizontally therefrom at an angle thereto, and a third vertically extending side panel 113 coupled to the rear panel 112 and extending horizontally therefrom at an angle thereto and in generally opposed relation to the first panel 111. FIG. 3 best shows the vertical panels 111, 112 and 113, which are advantageously formed integrally from a planar metal sheet to provide three connected vertical panels standing at generally right angles, with the first side panel 111 and third side panel 113 in generally parallel opposed relation. It can be seen from the drawings that each of said opposed side panels 111 and 113 has integral, inwardly extending formed front frame members 111a and 113a, respectively, with rearward extending formed flanges 111e and 113e, which are positioned parallel to each other to define the width of the front frame opening 114. The formed front frame members 111a and 113a, and rearward formed flanges 111e and 113e add lateral stiffness to the side walls and overall tower cage structure 110 and avoid any forward sharp material edges in the exposed cage structure. The described cage structure 110 may be advantageously formed on a brake press from a single sheet of aluminum of a desired thickness. Support base flanges 166 may be further formed inwardly from opposite ends of the bottoms of side panels 111 and 113 into horizontal positions in planar relation, and preferably each fitted with a base pad support 167, which may or may not include a conventional threaded leveler feature (not shown), to efficiently provide stable peripheral support for the cage structure 110. For tower assemblies 100 of 12 to 24 shelf size and capacity, as shown and described herein with reference to an exemplary 12 shelf tower cage structure 110, an aluminum panel sheet thickness of 0.090 of an inch has been found to provide suitable strength and cage rigidity to provide stable support for such storage and charging systems 90, loaded as described herein. Other existing or to be discovered sheet metal material, including mild steel and stainless steel, which provide suitable forming, strength, rigidity, weight and cost characteristics, may be utilized without departing from the spirit of the invention. Typically, any margins, openings, holes, slots and notches in the tower cage structure hereinafter described will be accurately cut or punched by a lazar machine, or mechanically punched, in the metal sheet stock prior to the forming steps previously described.

Figure 8:
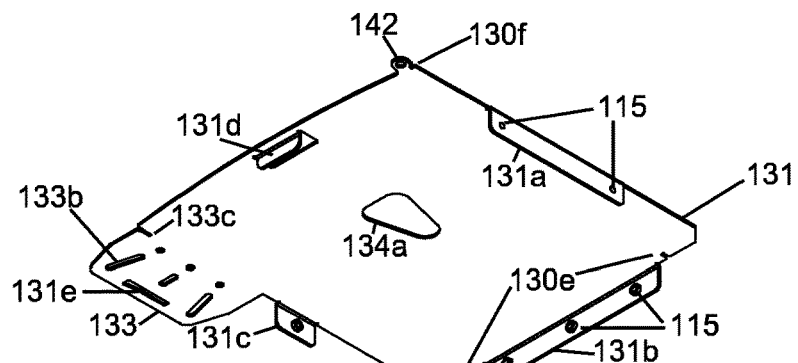
FIG. 8 is a left front isometric view of the underside of the downwardly flanged middle support shelf.

FIG. 3 illustrates how the three vertically extending panels 111, 112 and 113 are further connected to form a substantially rigid vertical support tower cage structure 110. In preferred order of assembly, a flanged unitary bottom support shelf 130, shown in more detail in FIG. 9, and also typically formed from similar aluminum sheet stock, is provided having a first upwardly extending side flange 130a for fastening to the lower portion of the inside surface of the first vertically extending side panel 111, a second upwardly extending rear flange 130b for fastening to the lower portion of the inside surface of the second upwardly extending rear panel 112, and a third upwardly extending side flange 130c for fastening to the lower portion of the third upwardly extending side panel 113. In each case, threaded holes 115 may be pre-punched and threaded in the upwardly extending flanges 130a, 130b, and 130c for engaging screw fasteners 116 extending through adjacent punched or cut panel fastener holes 117 in the associated cage panels and screwed into the threaded holes 115 of the flanges to securely connect the bottom support shelf 130 to the three vertically extending panels 111, 112 and 113. Likewise, a middle support shelf 131, shown in more detail in FIG. 8, is provided with similar, but preferably downward extending flanges 131a, 131b and 131c, with similar punched and threaded holes 115 for engaging screw fasteners 116 extending through punched panel fastener holes 117 in the middle portion of the three vertically extending panels 111, 112 and 113, in the same manner as described above for the bottom support shelf 130.

However, during assembly of the illustrated vertical tower cage structure 110, before either the bottom support shelf 130 or the middle support shelf 131 are fixedly connected to the three vertically extending panels 111, 112, and 113, a plurality of intermediate flat support shelves 132, which may be generally similar in marginal shape to the planar portions of the bottom shelf 130 and middle shelf 131 but have no flanges, will also be positioned within the support tower cage structure 110. As shown in FIG. 3, the shelves 130, 131 and 132 are planar sheets, except for the described flanges of the bottom and middle shelves 130 and 131. In addition, all of the common planar portions of the shelves may have the same marginal outer shape, including common side support shelf portions 133 if present, which are each adapted to protrude through a one of an adjacent, vertically spaced, array of horizontal shelf support slots 113b in the third upwardly extending panel 113 of the support tower cage structure 110. Additionally, each of the shelves except the middle shelf 131 and bottom shelf 130 have a substantially U-shaped front cut-out portion 134 to facilitate user grasping and removal of generally rectangular mobile electronic devices 50 positioned on the shelves and partially spanning the cut-out portions 134. Additionally, all of the support shelves except the bottom support shelf 130 are shown to have an additional finger opening 134a located behind the cut-out portions 134 to permit users to push up on the underside of a mobile electronic device 50 supported by a shelf to further facilitate easy removal of mobile electronic devices 50 from the tower assembly 100. The bottom support shelf 130 may have a front margin 130d which spans its cut-out portion 134 to provide additional marginal security structure for the bottom support shelf 130.

Figure 9:
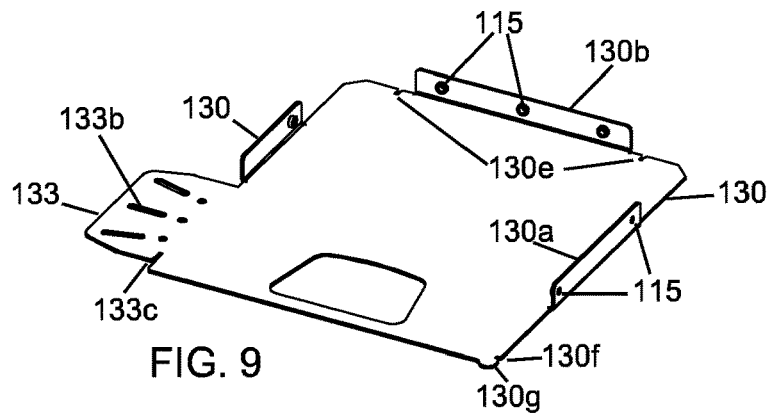
FIG. 9 is a left front isometric view of the upper side of the upwardly flanged bottom support shelf.

Before the flanged bottom shelf 130 and flanged middle support shelf 131 are connected, the first side panel 111, second rear panel 112 and third side panel members of the unitary support tower cage structure 110 are sufficiently flexible so that the front frame opening 114, defined by the double bended front vertical edges 111a and 113a of the vertical side panels 111 and 113, respectively, can be widened slightly by flexing the side panels 111 and 113 sufficiently to permit the bottom support shelf 130, middle support shelf 131 and all of the intermediate support shelves 132 to be easily inserted between the flexed side panels in a spaced vertical array, with the side support shelf portion 133 of each said shelf sliding and protruding through an adjacent vertically spaced horizontal shelf support slot 113b extending rearward from the front vertical edge 113a of third side panel 113. Further support for the support shelves 130, 131 and 132 can be seen from FIG. 3, with reference to the top shelf 132 exposed by the exploded position of flanged cover panel 135. FIGS. 8 and 9 show a shelf left front engagement finger slot 130f, common to all shelves, for engaging first panel inwardly extending, spaced horizontally slotted, front frame member 111a and for retaining shelves 130, 131 and 132 in respective position within the tower cage structure 110. The additional connecting structure and relationship to the shelf support structure of tower cage structure 110 is typically similar for all of the support shelves 130, 131 and 132, unless otherwise noted.

Figure 7:
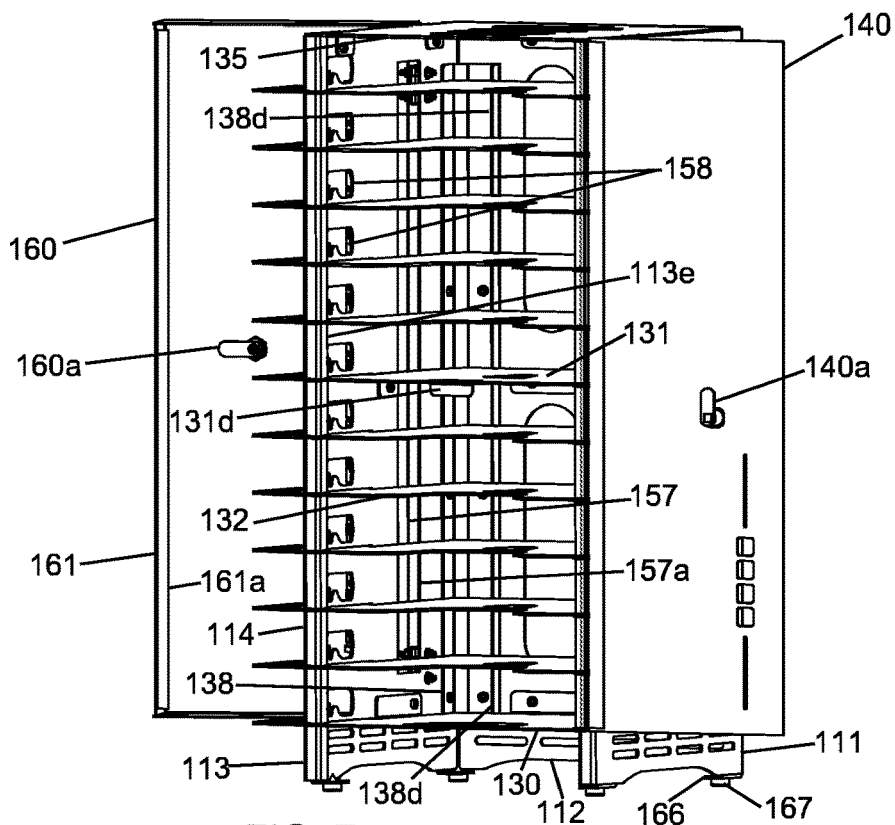
FIG. 7 is a left front planar view of the storage and charging station system of FIG. 2, wherein the main door and side cover door are in open positions and the inside surfaces of the second vertically extending rear panel and the third vertically extending side panel of the tower cage, and structure supported thereon, are illustrated.

Rear channel shelf supports 138 extend vertically upward within the rear inside corners of the unitary support tower cage structure 110 formed by the illustrated substantially right angle bends between the vertically extending first side panel 111 and second rear panel 112, the upper end of which is visible in FIG. 3, and likewise between the second rear panel 112 and the third side panel 113, which is identical in opposition position and placement, but reversed in orientation, as shown in FIG. 7. Each illustrated rear channel shelf support 138 has a side wall engagement flange 138a positioned flush against the inside surface of the adjacent side panel 111 or 113, and fastened thereto. The rear channel shelf supports 138 each further include an angle member 138b which bridges the proximate inside cage corner formed by the first side panel 111 and second rear panel 112, or formed by the second rear panel 112 and the third side panel 113, and an inner flange 138d which may extend inwardly at a right angle from the rear member 138c, which is positioned flush against and fastened to rear panel 112. It can be seen in FIGS. 4 and 5, that four screws 116 are positioned in vertically spaced relation through each of said side panels 111, 112 and 113 on either side of the two outside cage corners formed between side panels 111, 112 and 113, and thereby engaged with similarly vertically spaced punched and threaded holes 115 in the two rear channel support members, see FIG. 7, in a similar manner as described previously with respect to attachment through the rear panel of the shelf flanges to the cage panels. More specifically, the screw fasteners 116 which extend to the rear channel 138 through the rear panel 112 engage threaded holes 115 in the rear channel support rear member 138c. The screw fasteners 116 which extend through the side panels 111 and 113 to the rear channel 138 through the side panels 111 and 113 engage threaded holes 115 in the rear channel support side wall engagement flange 138a. As shown, the rear channel shelf support members 138 separately connect the rear panel 112 to each of the side panels 111 and 113 and provide additional stiffness and rigidity to the support cage structure 110. The inner ends of each vertical inner flange 138d are multiply slotted for a first portion of the inside horizontal length of each inner flange to form spaced horizontal finger groove interlocking shelf support slots 138e for engagement of an aligned finger slot 130e in the inner end of each one of the plurality of horizontal support shelves 130, 131 and 132.

Typically, the aligned shelf finger slots 130e are each as long as the remaining non-slotted portions of the inside horizontal length of the vertical inner flange 138d. The horizontal end slots 138e and of each rear channel shelf support 138 can be vertically spaced at the same heights as the corresponding horizontal shelf support slots 113b in the third vertically extending side panel 113. Thus, the rearward end of each engaging support shelf 130, 131, or 132, respectively, is doubly both vertically and horizontally supported in an aligned generally horizontal position. Likewise, double plane frame member 111a of vertical side panel 111, which partially defines the front frame opening 114, includes a vertical array of horizontal slots 111c aligned with opposed double plane frame member 113a, each of which slots 111c terminate short of the vertical side panel 111 to respectively provide finger slot end engagement with each shelf left front corner finger slot 130f of the vertical array of engaged support shelves 130, 131 and 132, to both support and retain the shelf left front corners within the support tower structure 110. As noted above, opposed aligned horizontal shelf support slots 113b of vertical side panel 113, by contrast, extend to the outer plane of panel 113, and further extend rearward within side panel 113 to support the full length of the side support shelf portions 133. In addition, each of the support shelves 131 and 132 includes a hinge rod retaining ring 142, which rings 142 extend forwardly from the shelf left front corners, as shown in FIGS. 8 and 9, and are aligned adjacent double plane frame member 111a when the arrayed support shelves are properly positioned within the unitary support tower cage structure 110, as shown in FIG. 3 and elsewhere in the drawings. Final assembly of the unitary support tower cage structure 110 then begins with connecting the upwardly flanged bottom support shelf 130 to the three integrally connected vertical panels 111, 112 and 113, as described above. This will pull the panels 111, 112 and 113 into flush engagement with the upwardly extending bottom shelf flanges 130a, 130b and 130c, and require the bottom shelf and many intermediate shelves 132 be brought into full alignment and close engagement with the previously described alignment and supporting structure of the unitary support tower cage structure 110.

The next assembly steps are to confirm the alignment of the intermediate shelves 132 in the middle portion of the cage panels 111, 112 and 113, with all of their points of contact and support in the cage structure, and then similarly connect the downwardly extending flanges 131a, 131b and 131c of middle shelf 131 to the cage panels 111, 112 and 113. In the illustrated embodiment, the bottom shelf 130 flanges and middle shelf 131 flanges are both successively fastened by two screws 116 to vertical side panel 111, three screws 116 to the vertical rear panel 112 and at least one screw 116 to the vertical side panel 113.

After all of the support shelves 130, 131 and 132 have been so positioned and fastened, a shelf retention plate 113c, the rear edge of which is provided with spaced horizontal finger groove shelf interlocking slots 113d to receive matching shelf side support finger grooves 133c in the front edges of each side support shelf portion 133, which side support finger grooves 133c are best shown in FIGS. 8 and 9, is engaged therewith and attached to the outside surface of side panel 113, as shown in FIG. 3, to fix, support and retain the shelf portions 133 and connected support shelves 130, 131 and 132 in place. The plate 113c may be fastened to the outer surface of side panel 113 by a plurality of screw fasteners 116 extending through holes (not shown) in plate 113c near the front frame member 113a to engage punched and threaded holes (not shown) in side panel 113, or by other suitable fastening means as previously described.

Figure 4:
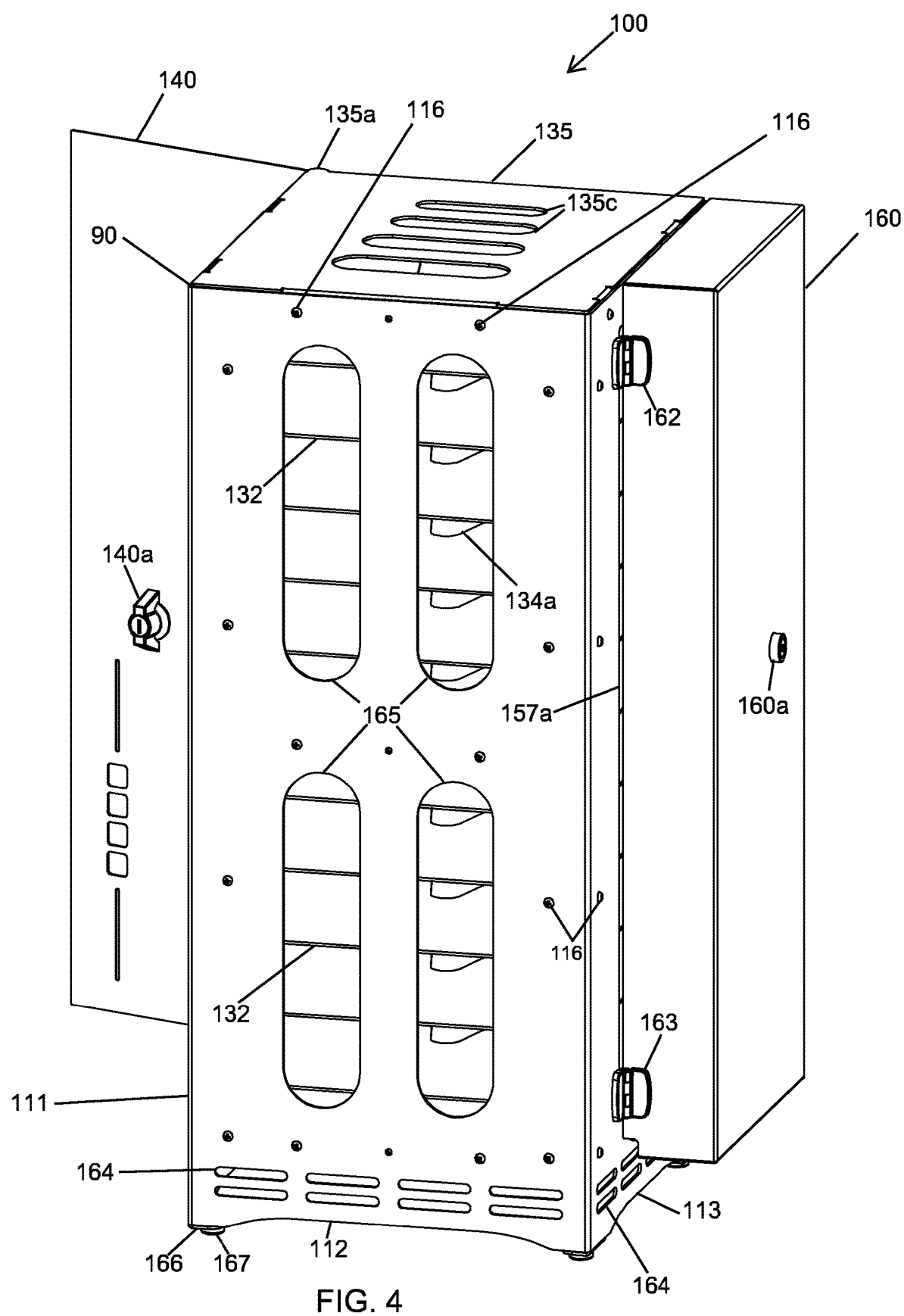
FIG. 4 is a right rear isometric view of the storage and charging station system of FIG. 2, wherein the main door is shown in a pivoted open position.
Figure 5:
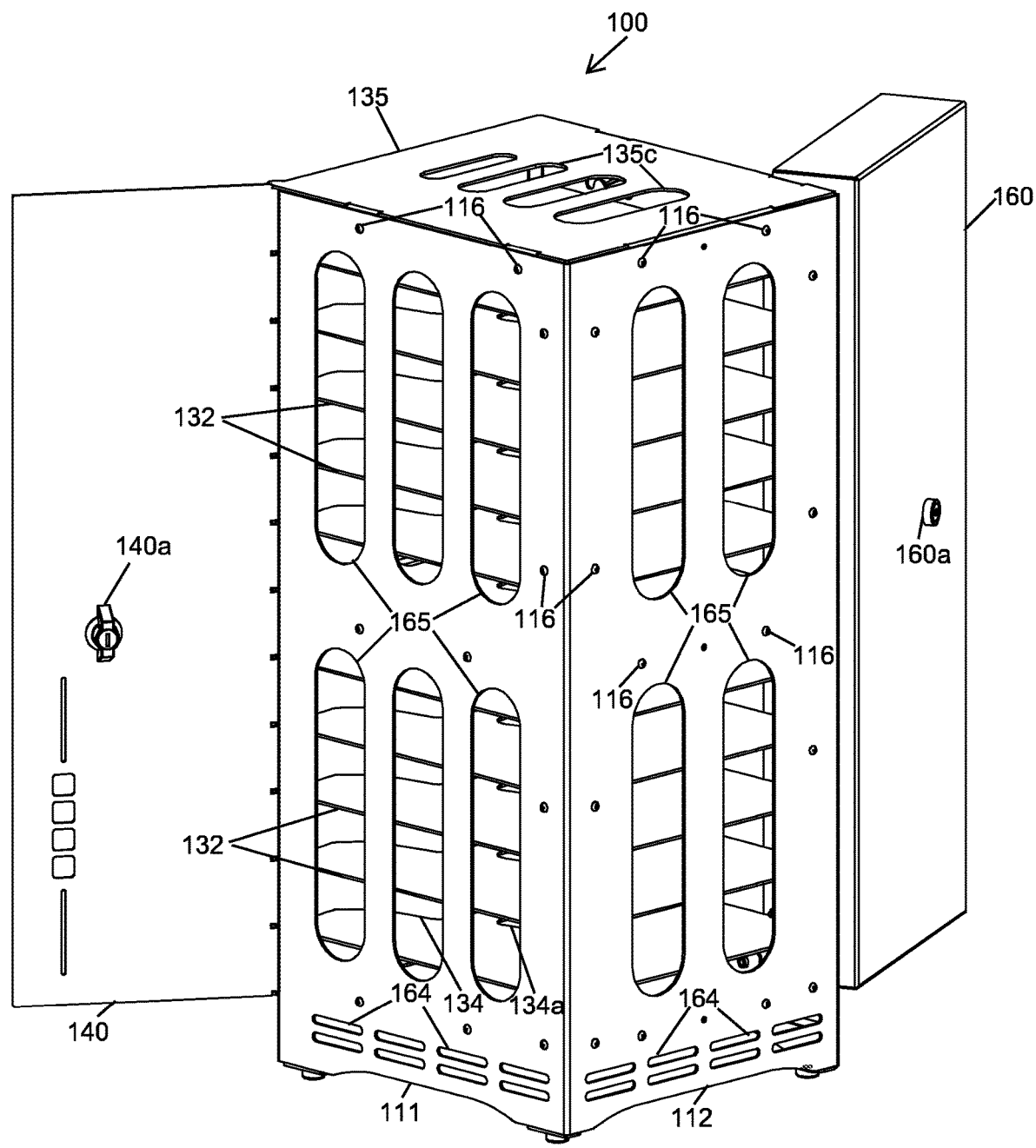
FIG. 5 is a left rear isometric view of the storage and charging station system of FIG. 2 wherein both the main door and the side cover door are shown in open positions.
Figure 6:
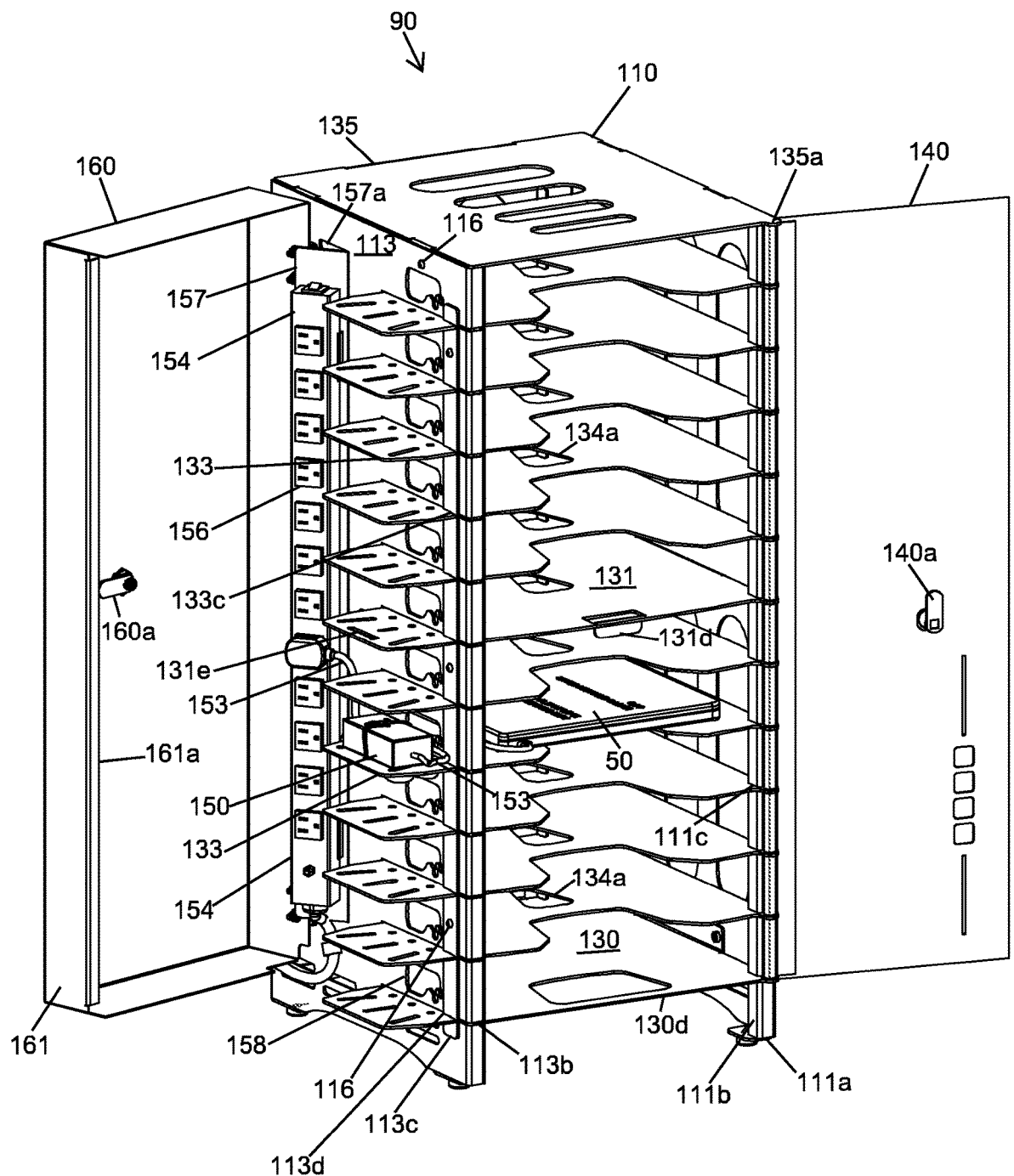
FIG. 6 is a right front isometric view of the storage and charging station system of FIG. 2, wherein the front and side doors are open to reveal the interior structural features of the unitary support tower cage structure, and wherein a mobile electronic device is shown on a support shelf and a charging device is shown positioned on a side support portion of said support shelf with electronic connection to an adjacent 120 power strip and to the mobile electronic device for charging.

Assembly of the unitary support tower cage structure 110 is then completed by fastening a flanged cover panel 135 to each of the panels 111, 112 and 113 near their upper edges, as shown in FIGS. 4-6. Thus, two or more first side cover flanges 135a which extend downwardly from the cover first side are fastened to the upper portion of the inside surface of the vertically extending first side panel 111 by two suitable screw fasteners 116 engaged with punched and threaded holes 115 in the cover flanges 135a, as previously described with respect to attachment of the flanges of the bottom shelf 130 and the middle shelf 131. In the illustrated embodiment, a single rear cover flange 115b with three punched and threaded holes 115 extends downwardly from the cover rear side and is similarly fastened by three screws 116 to the upper portion of the rear inside surface of the second vertically extending rear panel 112, and two or more third side cover flanges 115c extend downwardly from the cover third side and are similarly fastened to the upper portion of the third vertically extending side panel 113. It should be understood that the screw fasteners 116 and punched and threaded flange fastening holes 115 shown and described herein may be substituted for by any commercially available type of compact fasteners combinations which are presently known or yet to be designed, including commercially available PEM® nuts, rivets of various designs, threaded bolts or screws, various bolt and nut combinations, or any other known and commercially available suitable fasteners. Applicant has chosen the preferred illustrated and referenced punched and threaded holes 115 and fastening screws 116 for connecting the structural members of the substantially rigid vertical tower assembly 100 based upon their various qualities of strength, convenience of assembly and minimal appearance qualities, but other suitable known fasteners would be functionally suitable as well.

FIG. 3 and FIG. 6 further illustrate the side support shelf portions 133 each protruding through a one of the horizontal support slots 113b of third vertical side panel 113 from their associated support shelves 130, 131 and 132, to support transformers 150, one of which is exemplarily shown in FIG. 6, and connecting electronic cables 153 extending from a power source which may comprise power outlets 156 of a 120 volt power strip 154 to transformer 150 and then, as shown, to an assigned mobile electric device 50 supported by a one of the associated support shelves 130, 131 and 132. Alternatively, as shown in FIG. 3, a USB power strip 155 may be provided for conventional connection of USB cables extending directly to assigned mobile electronic devices positioned on the support shelves 130, 131 and 132. The support shelf portions 133 are each provided with cable management slots 133b of any desired configuration to conveniently 'store' any excess length of input or connecting cable 153. The third vertical side panel 113 defines a cable management access aperture 158 above each horizontal support slot 113b for accessing a selected length of an associated power output cable 153 to an assigned mobile electronic device 50 positioned upon the adjacent surface of an associated support shelf 130, 131 and 132, as exemplified in FIG. 6, for ease and convenience of connection and disconnection of the power output cable 153 to the mobile electronic devices 50 by individual users. The power strips 154 and 155 and associated electrical and electronic outlets 156 are each shown herein projecting through angled mounting flange 157 cut and angled outwardly from the third vertical side panel 113 of the vertical tower cage structures 110 of FIGS. 3 and 5. A side cover 160 is pivotally connected to the vertical side panel 113 by internally fastened upper hinge 162 and lower hinge 163. A lockable steel latch 160a on the side cover 160 registers with cover latch receiver slot 131e on the side support shelf portion 133 of flanged middle support shelf 131, to provide security for the power bricks 150 and connected input and output cables supported on the side support shelf portions 133. The front side panel 161 of the cover 160 may include a shortened formed inner edge 161a to permit a limited external view of the side support shelf portions 133 and any supported electronic components when the cover 160 is closed and locked, and provide ventilation for any electrical components on the side support shelf portions 133. Such shortened front panel inner edge 161a also permits users to extend the ends of connecting electronic cable 153 out through the opening between the cover inner edge 161a and the panel side wall 113, and around the front frame member 113a for convenient engagement with the charging ports of mobile electronic devices 50 positioned on the shelves 130, 131 and 132 for storage and charging.

FIG. 1 illustrates the an "open tower" embodiment of the invention for use by owner organizations in which security is not a concern, and/or whose users can at any time select any charged and available standard organization-owned mobile electronic device 50 to access user cloud-stored programs and data, and conversely return any low charge or discharged mobile electronic device 50 for recharging or service. In such organizations, and various other applications, convenience may outweigh mobile electronic device security concerns, and no main security door 140 may be desired by owners. The other Figures of the drawings are directed to a more secure embodiment of the present invention.

Referring to FIGS. 2-6, a planar main security door 140 may be efficiently provided with a tubular hinge housing 144 having an array of parallel cut ring slots 146 to define individual hinge housing sections 144a. The cut ring slots 146 are spaced apart to register with the vertically arrayed but horizontally extending hinge rod retaining rings 142 of the positioned support shelves 131 and 132, in the cage structure 110. The tubular hinge housing 144 may be fabricated by forming the slotted portion of a planar door blank over a mandrel, which may be a cylindrical hinge rod 148 itself, or over any suitable mandrel which duplicates the cylindrical structure of the hinge rod, to form the tubular hinge housing 144. A hinge flange 141 may be further provided by the remaining margin of the door sheet extending beyond the slotted portion of the tubular hinge housing 144 and formed to lie flat against the inside surface of the door 140. The door 140 is mounted on the cage structure 110 by positioning the cut tubular hinge housing sections 144a between the shelf retaining rings 146, and sliding hinge rod 148 vertically downward through the continuous hinge channel formed by the aligned sections of hinge housing sections 144a and hinge rod retaining rings 142. The flanged bottom support shelf 130 has a solid hinge rod retainer plate 130g, shown more clearly in FIG. 9, which extends beneath the tubular channel 144 in the same position relative to the bottom shelf as the retaining rings 146 have with respect to the shelves 131 and 132 from which they are formed. When a door 140 is provided as described, it is usually positioned on the support tower cage structure 110 prior to installation of the cover panel 135, more clearly shown in FIG. 8, which has a hinge rod cover plate 135a extending over the installed hinge rod 148. FIG. 2 shows that the main security door 140 may advantageously not extend fully across the front frame opening 114 to permit external visual observation of the interior shelves 130, 131, and 132, and any mobile electronic devices 50 being stored and charged thereon. Accordingly, even though the door 140 is closed and locked, system administrators may determine from an external glance whether any tower shelf is empty or supports an assigned mobile electronic device 50. At the same time, the portion of the frame opening 114 not covered by the locked door 140 is not of sufficient size to permit removal of any intended stored mobile electronic devices 50 from that tower assembly 100. In addition, the portion of the frame opening 114 not covered by the locked main security door 140 advantageously provides an additional opening for facilitating transmission of electronic data to and from any mobile electronic device 50 within support tower cage structure 110, as well as ventilation and cooling of the tower assembly 100. Where maximum security is desired, the main door 140 for the tower cage structure 110 may be fabricated from 14-gauge steel, as can be the cover panel 135, and hinge rod cover plate 135*a*. The hinge rod 148 is also preferably steel. A lockable steel latch 140*a* is shown on main door 140, which when locked engages door latch retainer flange 131*d* extending downwardly from middle support shelf 131, which may also be made from 14-gauge steel for compatibility with steel latch 140*a*. Such steel construction will substantially deter unauthorized attempts to remove mobile electronic devices 50 from the illustrated tower assemblies 100.

FIGS. 3-6 and 10 illustrate important further advantages of the unitary support tower cage structure 110 of the invention, namely the ability to define a plurality of substantial multi-functional openings in the vertical panels 111, 112 and 113, and the cover panel 135, while maintaining the structural stability and support strength of the cage structure itself. In addition to the plurality of vertically spaced horizontal shelf support slots 113*b* and cable management access openings 158 illustrated in FIGS. 3 and 6, vertical ventilation opening 157*a*, identified in FIGS. 3 and 6, created by the partial displacement from vertical panel 113 of the angled mounting flange 157 for the illustrated USB and 120 volt power strips 155 and 154 provides additional ventilation for the electrical components, including any transformers 150 positioned on the side support shelves 133, when the pivotal side cover 160 is closed during normal operation of the storage and charging system 90.

FIGS. 4 and 5 further illustrate the presence of lower horizontal ventilation slots 164 positioned below the level of the planar bottom shelf 130 within all three vertical side panels 111, 112 and 113. All such lower ventilation slots 164 enable convection currents to draw cooling air into the support cage 110 through the slots 164 and flow upwardly through openings in the horizontal support shelves 130, 131 and 132 to provide ventilation and cooling to mobile electronic devices 50 being charged on the support shelves. Additional cover plate ventilation openings 135*c* exhaust such upwardly moving air to the surrounding environment.

FIG. 5 further illustrates that the vertical side panel 111 and vertical rear panel 112 of the preferred embodiment of FIGS. 1 and 2, may each include a plurality of vertically extending multifunctional observation, ventilation and transmission (OVT) openings 165 of substantial size. It can be seen that vertical rear panel 112 has two upper OVT openings 165 and two lower OVT openings 165, which upper and lower OVT openings 165 likewise freely enable direct unimpeded transmission of electronic communications to and from mobile electronic devices 50 located on any support shelf within the metal support tower cage structure 110, thus permitting electronic updating and electronic response by the mobile electronic devices 50 to data queries during periods of storage and charging, even though the mobile electronic devices 50 are securely within the unitary metal cage structure.

Figure 10:
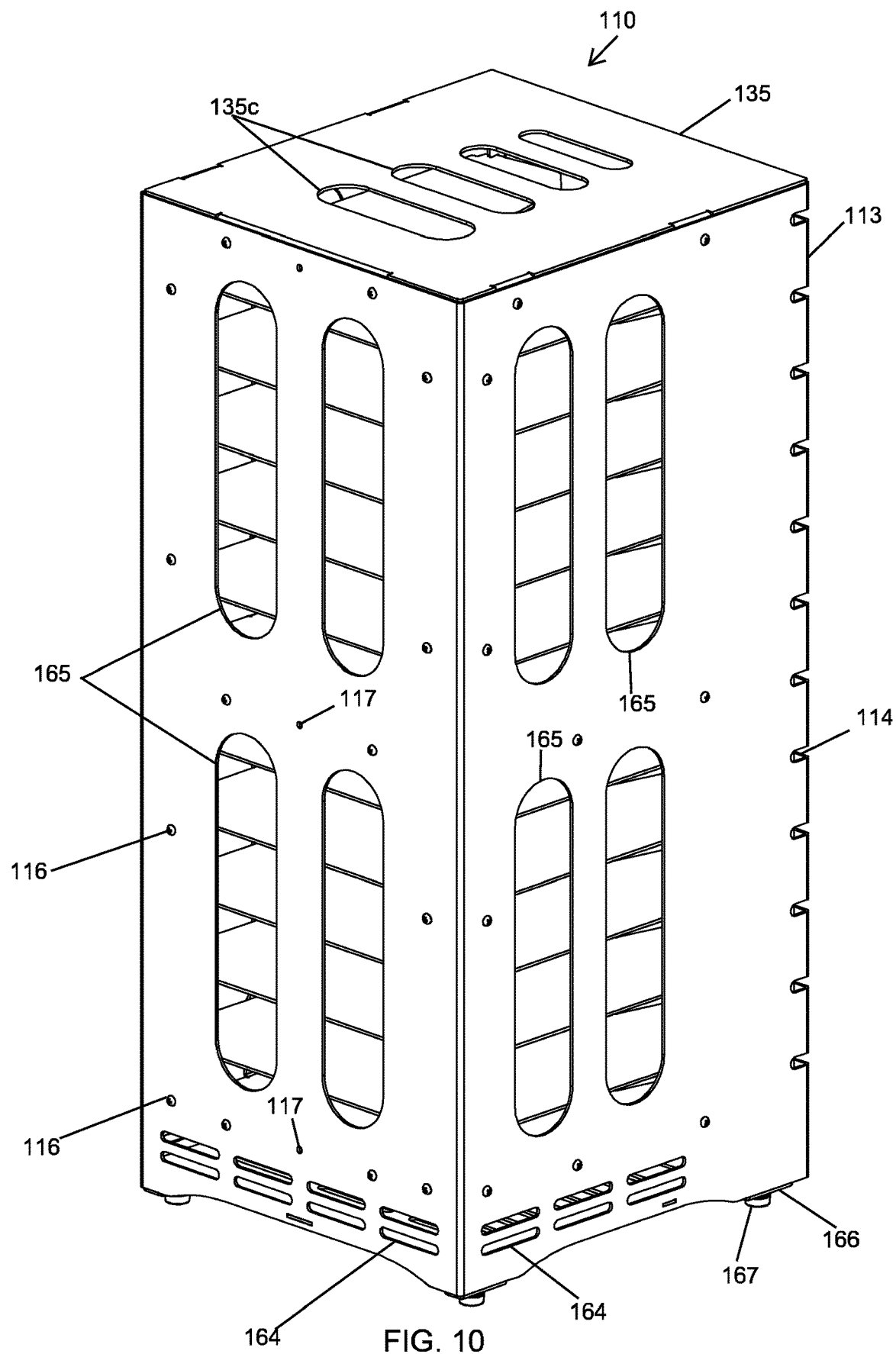
FIG. 10 is a left rear isometric view of an embodiment of the invention, wherein the third vertically extending side panel of the support tower cage structure does not have vertically spaced horizontal shelf support slots and the shelf support members are contained within the margins of the support tower cage structure without outwardly extending side support shelf portions or side cover door.

It should be understood that the sizes and shapes and number of OVT openings 165 on any side of the cage structure are variable, according to the needs and preferences of the designer, and the preferred placement of structural fasteners, brackets, flanges, support slots, cable management openings and other electrically or structurally desirable components. Relatively large OVT openings 165, as shown in FIGS. 4 and 5 which comprise between 30 and 40 percent of the area of the panels, may most efficiently be cut in the sheet stock from which the cage structure is formed by a lazar machine. Alternatively, a larger number of smaller OVT round openings providing generally the same percentage of open panel area could most likely be efficiently mechanically punched. It should also be clear that any support structure, electronic components, openings, connections, brackets or any other structural components illustrated in any position or on any panel in the illustrated and described embodiments can be rearranged, reversed, inverted or otherwise alternately located without changing the functionality of the tower assembly 100 as herein illustrated and described. As examples of the flexibility of the tower assembly 100 disclosed and claimed herein, FIG. 1 illustrates a tower assembly wherein the power components are supported externally on the third panel 113, with a hinged pivotal cover 160. Such components could be alternately designed to be supported on the opposite side panel 111 in a similar manner, if desired. In such case the OVT openings 165 of side panel 111 of the presently illustrated and described embodiment could be provided on panel 113. A main lockable door 140 can be provided as in FIG. 2, or not as in FIG. 1. FIG. 10 illustrates a support tower cage structure 110 in which all three integral panels include OVT openings 165, but the OVT openings 165 of side panel 113 are set back from the front edge of the panel to permit location of a selected power supply system on or supported by the front portion of vertical panel 113. It should also be understood that while a one piece integral three sided support tower cage structure is advantageously disclosed and provided in this specification, a more complex three piece tower could be provided by welding or otherwise coupling three vertical panels together wherein the various support slots and multifunctional openings and ventilation openings could be provided as illustrated and/or described.

All of the metal components of the disclosed tower assemblies are preferably powder coated for protection, improved appearance and ease of sanitary cleaning. Powder coating can be done in almost any color or colors, and can be shiny or opaque. Accordingly, the tower assembly 100 can be provided to educational buyers in school colors, and to commercial companies in colors to match or complement company logos, marketing themes, work environment or buyer preference.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. As multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A storage and charging station system for mobile electronic devices comprising:
    a support tower cage structure having a first vertically extending side panel, a second vertically extending rear panel, and a third vertically extending side panel, said first side panel being coupled along a first rear edge to an adjacent first side edge of said second rear panel at an angle thereto, said third side panel being coupled along a first rear edge to an adjacent opposite side edge of said second rear panel at an angle thereto whereby said first and third side panels are generally positioned in opposed facing relation,
    said first and third side panels each having a formed vertically extending front side which extends generally inwardly from the plane of its connected side panel toward the opposite side panel and then rearward to together define a front frame opening, said panel front sides each having a plurality of vertically spaced horizontal slots spaced in horizontally opposed relation whereby each horizontal slot of said first side panel is level with a corresponding paired opposed horizontal slot of said third side panel,
    at least one rear channel shelf support member coupled to the forwardly facing inside surface of said vertically extending rear panel, said at least one shelf support member providing at least one horizontal shelf rear support surface at a selected level with respect to the level of each level horizontal slot pair of said first side panel and said third side panel,
    a plurality of substantially planar support shelves dimensioned to engage generally horizontally within the confines of paired vertically extending side panel front side horizontal slots and said rear panel and also be supportable on said at least one shelf rear support surface positioned at a selected level with respect to the said engaged pair of front frame horizontal slots, whereby each of said plurality of said planar support shelves is adapted to support a mobile electronic device for electrical charging and storage,
    a bottom support shelf of said plurality of support shelves being positioned in alignment with the lower paired front frame horizontal slots and having side and rear flanges fastened to the inside surfaces of the vertically extending side and rear panels to fix the lower positions of the panels in the support tower cage structure,
    at least one middle support shelf of said plurality of shelves being, positioned in alignment within front frame aligned slots in an intermediate area of the support tower cage structure and having side and rear flanges fastened to the inside surfaces of the vertical side and rear panels to fix the positions of the panels in the middle section of the support tower cage structure,
    a flanged cover panel having downwardly extending side and rear flanges adjacent to upper margins of the vertically extending side and, rear panels and fastened to side and rear panels to fix the positions of the upper portions of the panels at the top of the support tower structure; and
    at least one power source coupled to said support tower cage structure to supply electricity for simultaneous and selective electronic charging of at least one mobile electronic device on each shelf of the storage and charging system.

2. The storage and charging system of claim 1, wherein said second vertically extending rear panel is coupled to said first vertically extending side panel and to said third vertically extending side panel by being integrally formed from metal sheet stock as a single unitary body.

3. The storage and charging system of claim 1, wherein at least one of said vertical panels of the support tower cage structure has a plurality of substantial multi-functional openings to facilitate external observation to detect the presence or absence of mobile electronic devices on each of said support shelves, to facilitate ventilation of the interior of the support tower cage structure during charging of mobile electronic devices positioned on said support shelves, and to facilitate wireless transmission of electronic data to mobile electronic devices positioned on said support shelves within said tower cage structure and outward responsive transmissions of electronic data by said mobile devices to outside electronic queries for information.

4. The storing and charging system of claim 1, wherein a main security door is hinged to one of the sides of the front frame opening to provide a secure closure for the tower cage structure interior, and wherein the security door is provided with a lockable latch.

5. The storage and charging system of claim 4, wherein the main security door has a closed position which does not cover the entire front frame opening to thereby permit external visual confirmation through the uncovered portion of the front frame opening of the presence and absence of mobile electronic devices for each of the support shelves while blocking removal, of any such mobile electronic devices from within the tower cage structure.

6. The storage and charging system of claim 4, wherein the main security door lockable latch is retained in closed position by locking engagement with a latch retainer flange extending from a support shelf.

7. The storage and charging system of claim 6, wherein a cover plate extends from the said cover panel to prevent removal of the positioned hinge pin from the tubular channel.

8. The storage and charging system of claim 7, wherein a vertical shelf retention plate is engaged on the outside surface of the third vertically extending side panel, said shelf retention plate having along its rearward edge a plurality of vertically spaced horizontal finger groove slots corresponding to the number and spacing of said third panel vertically spaced horizontal shelf support slots, said retention plate finger groove slots each being engaged with a finger groove slot on the rear inner edge of each side support shelf portion to retain each of the horizontal shelves in place within the support cage structure.

9. The storage and charging system of claim 7, wherein a plurality of cable management apertures is defined by said third vertical side panel, each of said cable management apertures being located above a horizontal shelf support slot of said third vertical side panel to facilitate managing and extending electrical cable access from the side support shelf portion to adjacent mobile electronic devices positioned on the interior shelf.

10. The storage and charging system of claim 7, wherein a side cover is pivotably attached to said third vertically extending side panel, and a lockable latch is mounted on said cover and registers with a latch receiver slot on an enclosed side support shelf portion to provide enclosure for said side support shelf portions and electrical components supported thereon.

11. The storage and charging system of claim 10, wherein the cover has a front side panel with a shortened edge to permit limited visual access to the covered side support shelf portions and their contents when the cover is locked in its closed position.

12. The storage and charging system of claim 4, wherein the main security door is formed from metal sheet stock slotted on its hinge side to correspond in slot width and spacing to the spaced horizontal slots of the first side panel front frame member, and wherein the slotted portion of the door is formed to comprise a tubular hinge housing shaped to receive a cylindrical hinge pin in rotatable relation, and wherein each of the support shelves has a shelf retaining ring which projects outwardly through a slot of said first side panel frame opening with the projecting ring openings in alignment, whereby the slotted tubular hinge housing sections fit between and in alignment with said projecting shelf retaining rings to combine to form a tubular channel for engagement of a cylindrical hinge pin, which pin is retained in said tubular channel by an aligned solid hinge rod retainer plate projecting from the bottom support shelf similarly to the projection of said shelf retaining, rings of the shelves located above the bottom shelf.

13. The storage and charging system of claim 4 wherein the tower cage structure is metal and is powder coated for protection, appearance and ease of cleaning.

14. The storage and charging system of claim 1, wherein said third panel vertically spaced horizontal shelf support slots extend rearward from said third panel front side for a selected distance, and wherein said plurality of substantially planar support shelves each have a side support shelf portion extending outwardly a selected distance through and supported by a one of said horizontal shelf support slots for substantially the length thereof to provide a side support shelf portion adjacent to said vertically extending third panel outside surface for the support of electrical components electronically connectable to mobile electronic devices positioned on each said planar support shelf.

15. The storage and charging system of claim 1, wherein the at least one horizontal shelf support surface coupled to the inside surface of the vertically extending rear panel is provided by a pair of vertically extending rear channel shelf supports which extend upwardly within the rear inside corners of the support tower cage structure to provide horizontal support for each of the plurality of support shelves, said spaced channels each providing a forwardly extending inner flange which has a plurality of vertically spaced horizontal finger slots extending rearward into each of the said inner flanges for a portion of the inside horizontal length of the flanges to engage an aligned finger slot in the inner end of each of said horizontal support shelves, whereby the lower horizontal margins of the flange finger slots provide two spaced horizontal rear shelf support surfaces for each of the plurality of engaged shelves aligned with each level horizontal slot pair of said first side panel and said second side panel.

16. The storage and charging system of claim 15, wherein said vertically extending rear channel shelf supports are each fastened to said rear panel and a one of said side panels to reinforce the support tower cage structure.

17. The storage and charging system of claim 1 wherein the said at least one power source is a multi-port USB power strip mounted on a portion of said vertically extending third side panel adjacent to a plurality of cable management apertures defined by said vertically extending third side panel for providing connecting cable access to mobile electronic devices positioned on said plurality of support shelves.

18. The storage and charging system of claim 1 wherein the said at least one power source is a multi-outlet 120 volt power strip mounted on a portion of said vertically extending third side panel adjacent to a plurality of side support shelf portions for supporting electronic components and further adjacent to a plurality of cable management apertures defined by said vertically extending third side panel for providing connecting cable access to mobile electronic devices positioned on said plurality of support shelves.

* * * * *